United States Patent
Hashimoto et al.

(10) Patent No.: US 6,263,201 B1
(45) Date of Patent: Jul. 17, 2001

(54) SCHEDULED DATA TRANSMISSION SYSTEM, SCHEDULED DATA TRANSMISSION METHOD, AND TRANSMISSION SERVER

(75) Inventors: Hideki Hashimoto; Isao Okazaki; Kazuhiko Seki, all of Tokyo (JP)

(73) Assignee: Uniden Corporation, Tokyo (JP)

( * ) Notice: Subject to any disclaimer, the term of this patent is extended or adjusted under 35 U.S.C. 154(b) by 0 days.

(21) Appl. No.: 08/997,672

(22) Filed: Dec. 24, 1997

(30) Foreign Application Priority Data

Dec. 25, 1996 (JP) .................................................. 8-345107

(51) Int. Cl.⁷ ............................................................ H04Q 7/20
(52) U.S. Cl. ............................ 455/403; 455/18; 370/345
(58) Field of Search ............................. 455/18, 412, 414, 455/422, 403, 31.1, 3.1, 450, 509, 515; 370/351, 401, 463, 345, 329, 442, 437, 348, 343

(56) References Cited

U.S. PATENT DOCUMENTS

| | | | |
|---|---|---|---|
| 5,404,505 | * | 4/1995 | Levinson ................................ 395/600 |
| 5,610,910 | * | 3/1997 | Focsaneanu et al. ................. 370/351 |
| 5,673,322 | * | 9/1997 | Pepe et al. .............................. 380/49 |
| 5,724,355 | * | 3/1998 | Bruno et al. ........................... 370/401 |
| 5,809,415 | * | 9/1998 | Rossman ................................ 455/422 |
| 5,812,780 | * | 9/1998 | Chen et al. ........................ 395/200.54 |
| 5,920,701 | * | 7/1999 | Miller et al. ..................... 395/200.58 |
| 5,930,702 | * | 7/1999 | Goldman et al. ..................... 455/417 |
| 5,951,644 | * | 9/1999 | Creemer ................................ 709/229 |
| 5,991,279 | * | 11/1999 | Haugli et al. ......................... 370/311 |
| 5,991,306 | * | 7/1999 | Burns et al. ........................... 370/429 |
| 6,055,441 | * | 4/2000 | Wieand et al. ........................ 455/557 |
| 6,058,422 | * | 5/2000 | Ayanoglu et al. .................... 709/226 |
| 6,108,314 | * | 5/2000 | Jones et al. ........................... 370/294 |
| 6,119,017 | * | 9/2000 | Cassidy et al. ....................... 455/518 |

FOREIGN PATENT DOCUMENTS

| | | |
|---|---|---|
| 5-167613 | 7/1993 | (JP) . |
| 5-224837 | 9/1993 | (JP) . |
| 5-250319 | 9/1993 | (JP) . |
| 5-265909 | 10/1993 | (JP) . |
| 6-6377 | 1/1994 | (JP) . |
| 6-103199 | 4/1994 | (JP) . |
| 7-302236 | 11/1995 | (JP) . |
| 8-36555 | 2/1996 | (JP) . |

* cited by examiner

Primary Examiner—William G. Trost
Assistant Examiner—Congvan Tran
(74) Attorney, Agent, or Firm—McDermott, Will & Emery

(57) ABSTRACT

This invention makes it possible to link separately employed pagers, PHS, and other data terminals with computer networks such as the Internet, and to schedule transfer of data to the data terminals. In a system for transferring message to pagers from user terminals connected to the Internet, a user terminal indicates to a transmission server the time for message transfer, and the transmission server, using a code conversion table, converts the message to the code adapted to the particular pager service provider and pager terminal, and transmits the message to the pager terminal at the indicated time.

16 Claims, 20 Drawing Sheets

CONFIGURATION DIAGRAM OF SCHEDULED MESSAGE TRANSMISSION SYSTEM

FIG.11

Virtual PockeBell

| PAGER PROVIDER | COMPANY A ▼ |
| --- | --- |
| PAGER MODE | MODEL 4 ▼ |
| TRANSMISSION TIME | 11/26, 15 : 30 |
| TELEPHONE NUMBER | 03-××××-×××× |
| FIXED MESSAGE | GOING HOME NOW ▼ |

TRANSMISSION CONTENT

PLEASE CALL
WILL BE LATE
THERE'S BEEN A CHANGE
EVENT CANCELED
GOING HOME NOW
PHONE MESSAGE WAITING
WHAT ARE YOU DOING NOW ?

[SEND] [REDO]

FIG.12

SCHEDULED MESSAGE TRANSMISSION DATABASE

| TRANSMISSION TIME | RECIPIENT | TRANSFER PROVIDER | RECIPIENT MODEL | MESSAGE |
|---|---|---|---|---|
| 11/18, 10:00 | 03-XXXX-XXXX | PROVIDER 1 | MODEL 2 | PLEASE CALL |
| | | " | " | WILL BE LATE |
| | | " | " | THERE'S BEEN A CHANGE |
| | | " | " | EVENT CANCELED |
| | | " | " | GOING HOME NOW |
| | | " | " | PHONE MESSAGE WAITING |
| | | " | " | WHAT ARE YOU DOING NOW ? |
| | | PROVIDER 2 | MODEL 1 | (CALL ONLY) |
| | | " | MODEL 2 | (ANY TEXT) |
| | | " | MODEL 3 | (TRANSFER E-MAIL) |
| | | " | MODEL 1 | (THANX !) |
| | | " | MODEL 2 | (FIXED) |

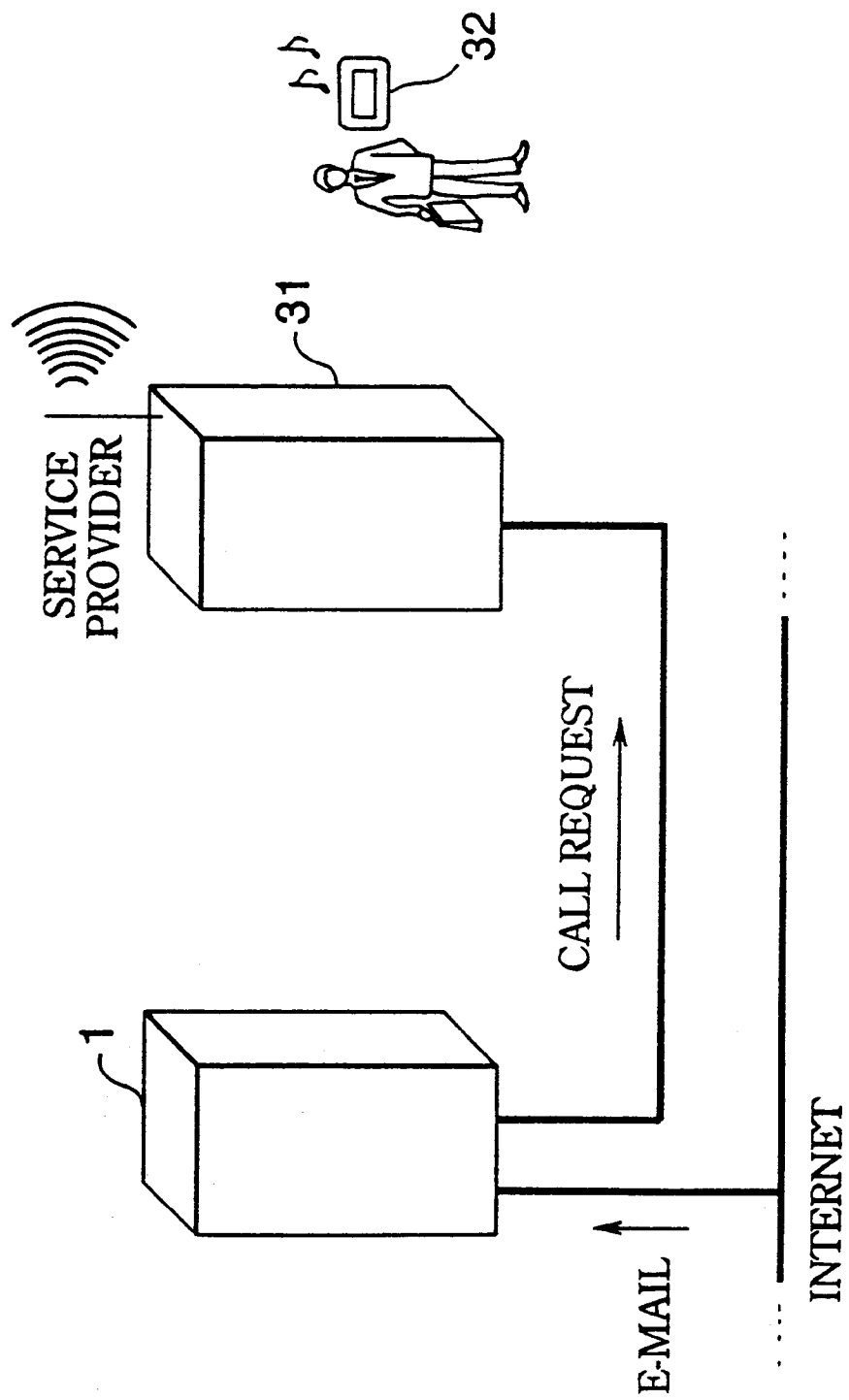

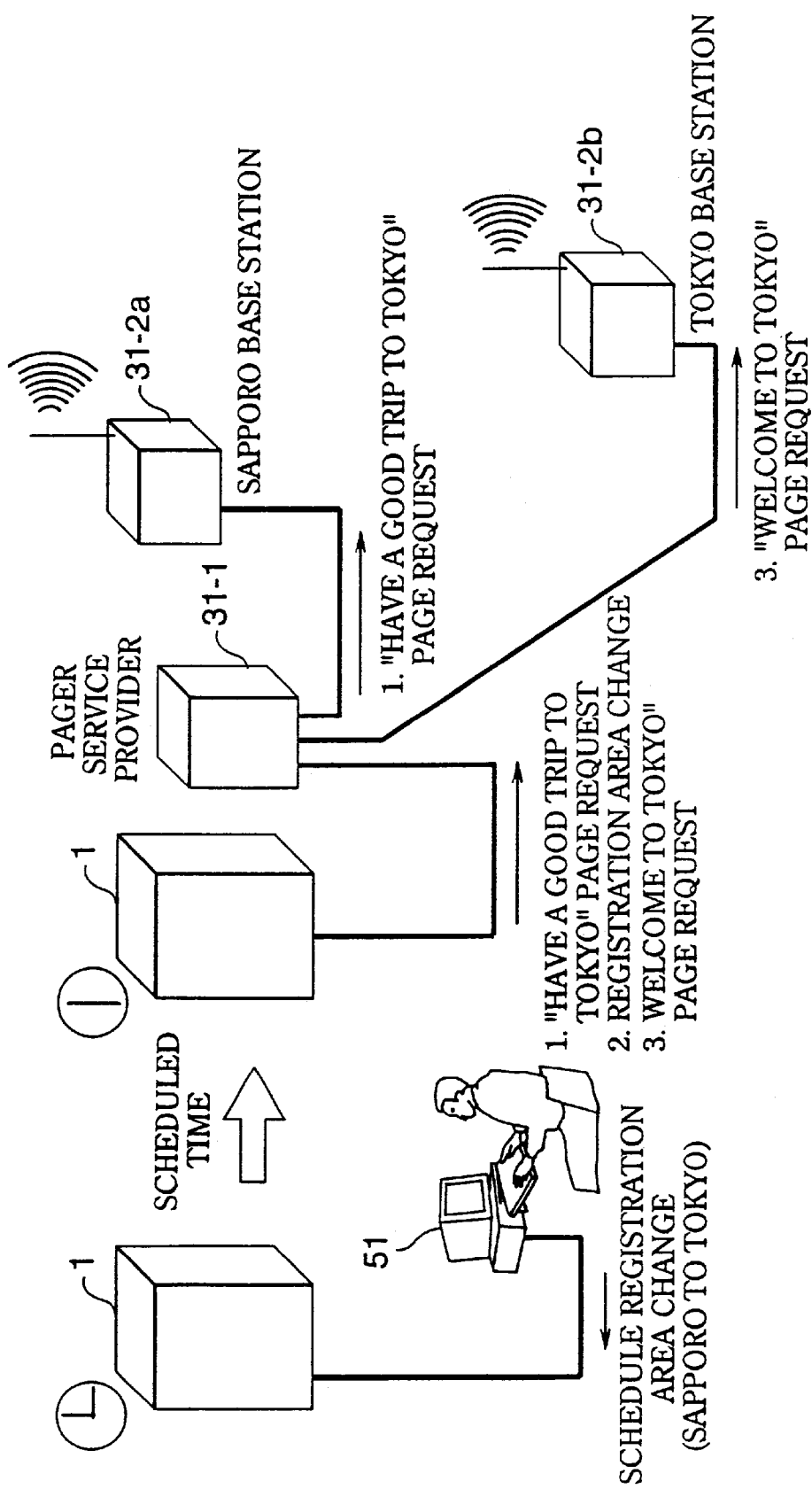

FIG.15A

| CHANGE DATE/TIME | AREA BEFORE CHANGE | AREA AFTER CHANGE | VERIFICATION Y/N |
|---|---|---|---|
| 11/26, 15:30 | SAPPORO | TOKYO | YES |
| | | | |

FIG.15B

| CHANGE DATE/TIME | REGISTRATION AREA | MESSAGE |
|---|---|---|
| 11/26, 10:00 | SAPPORO | HAVE A GOOD TRIP TO TOKYO |
| 11/26, 15:30 | SAPPORO >> TOKYO | (NONE) |
| 11/26, 19:00 | TOKYO | WELCOME TO TOKYO |
| | | |

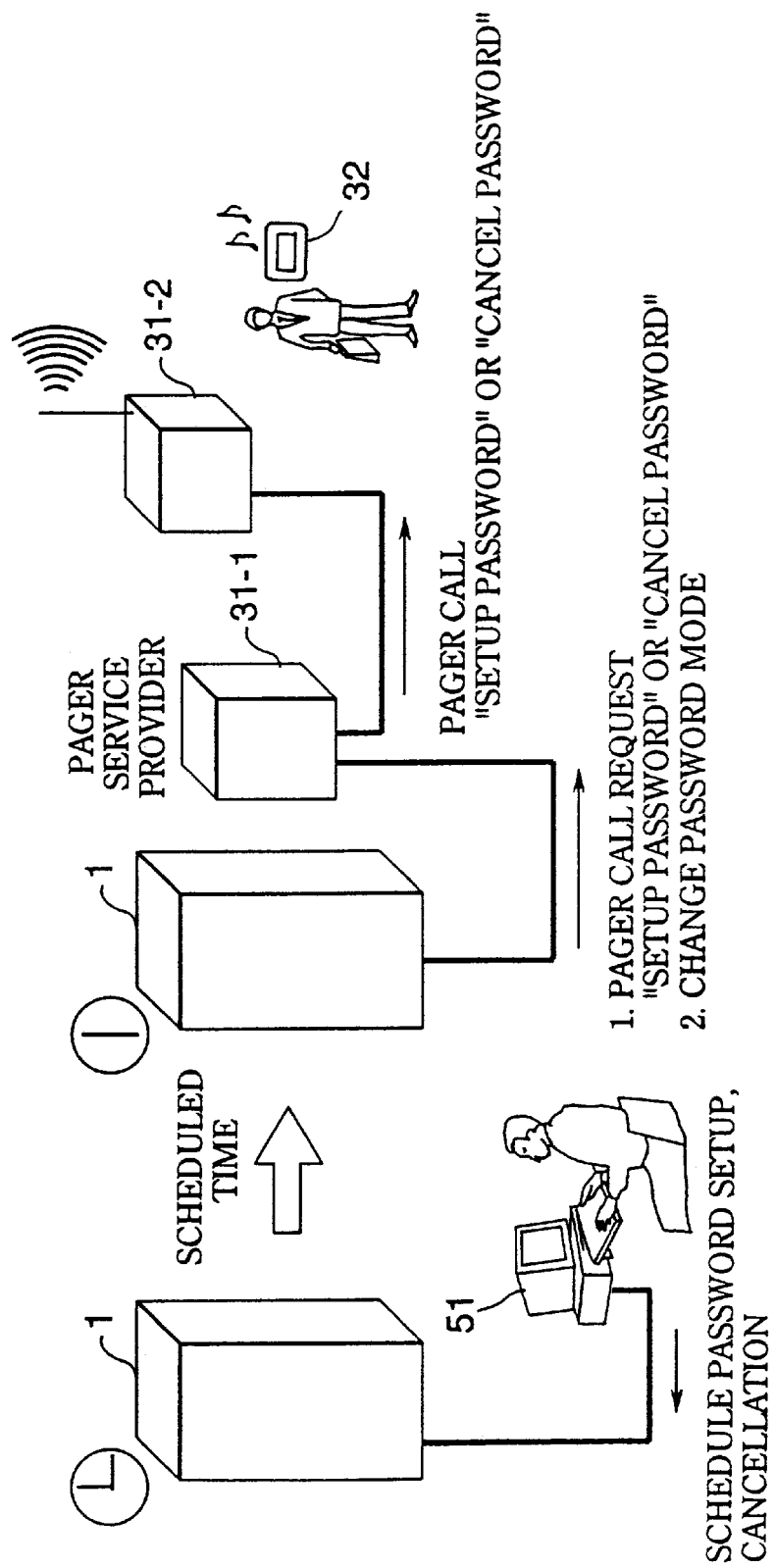

FIG.17

| DATE/TIME | SETUP/ CANCEL | PASSWORD | MESSAGE |
|---|---|---|---|
| 10/25, 21:45 | SETUP | ×××××× | SETUP PASSWORD |
| 10/29, 12:50 | CANCEL | — | CANCEL PASSWORD |
| | | | |

FIG.18

CODE CONVERSION DATABASE

|  | PROVIDER 1 | | | PROVIDER 2 | | |
|---|---|---|---|---|---|---|
| CODE | MODEL 1 | MODEL 2 | MODEL 3 | MODEL 1 | MODEL 2 | MODEL 3 |
| A | A11 | A12 | A13 | A21 | A22 | A23 |
| B | B11 | B12 | B13 | B21 | B22 | B23 |
| C | C11 | C12 | C13 | C21 | C22 | C23 |
| ⋮ | ⋮ | ⋮ | ⋮ | ⋮ | ⋮ | ⋮ |

SCHEDULED DATA TRANSMISSION SYSTEM, SCHEDULED DATA TRANSMISSION METHOD, AND TRANSMISSION SERVER

BACKGROUND OF THE INVENTION

1. Field of the Invention

This invention is a scheduled data transmission system comprising user terminals connected to a communications network, wireless calling equipment for transmitting data for execution of prescribed processes with respect to wireless terminals on the basis of instructions from the user terminals, and transmission servers; a scheduled data transmission method; and a transmission server, and more particularly provides a scheduled message transmission service, mail waiting notification service, a registration area change service, a password setup/cancellation service, and other services.

2. Description of the Related Art

In recent years, individual portable wireless terminals such as handy phones, Personal Handy Phone system (PHS), pagers, and the like have some into widespread use in business and personal applications. These systems utilize telephones for voice communications, and transmit prescribed messages.

Meanwhile, computer communications networks such as the Internet are also becoming popular, and transmission of data among computers has become easy.

It is possible to connect a portable wireless terminal to the Internet in order to send and receive data; if the proper system were set up, it would also be possible to control portable wireless terminals through the Internet. Linking the two would make it possible to provide various services, such as message transfer services.

While not directly related to the area of portable wireless terminals, Kokai 8-103199 discloses a message transfer system for use in a computer network environment. It discloses a technique whereby messages can be transferred automatically by storing in a storage area messages that have been transmitted through communications circuits and analyzing them in an analysis area on the basis of user data tables located in a table area; the user registers the name of the transfer server which is the intended recipient of the message.

However, in this technique of the prior art, the message recipient is determined from the long-in/log-out status of the computer users, from the up/down status of the hardware, and from the connection status among computers; thus, even if it could be implemented in a computer network, it would not be possible to control or conduct message transfer with various types of portable wireless terminals. Even if it should become possible, users would experience inconvenience in some cases.

In the area of data communications over the Internet, best effort, that is, the delivery of information to intended recipients tin as timely a fashion as possible, has always been the goal. However, depending on the intended use and mode of use, this is not always necessary, and in some cases delayed arrival of information may be more in line with the needs of the intended recipient.

SUMMARY OF THE INVENTION

This invention provides a scheduled data transmission system for linking separately employed pagers, PHS and other data terminals with computer networks such as the Internet, a scheduled data transmission method, and a transmission server.

This invention provides message transfer from computer networks to data terminals, and affords easy operation of data terminals of any kind, without requiring difficult operation.

This invention also makes it possible to ascertain whether a user accessing a service has found the specific service useful and has subsequently decided to register.

This invention is also intended to encourage registration, which is advantageous from the service provider's perspective.

The scheduled data transmission system which pertains to this invention is a scheduled data transmission system provided with user terminals connected to a communications network, with wireless calling equipment for transmitting data for execution of prescribed processes to wireless terminals on the basis of instructions from the user terminals, and with transmission servers. The user terminals transmit to the transmission servers scheduling information for transmitting data to the wireless terminals at designated times, and the transmission servers transmit this data to the wireless calling equipment at the designated times on the basis of this scheduling information so that prescribed processes are executed with respect to the wireless terminals.

The transmission server which pertains to this invention is a transmission server for transmitting to wireless calling equipment, on the basis of instructions from user terminals connected to the communications network, data for execution of prescribed processes with respect to the wireless terminals. The transmission server comprises reception means for receiving scheduling information from the user terminals, a scheduling information database for storing the scheduling information, a code conversion database for converting the scheduling information so as to be compatible with the wireless terminals and wireless calling equipment, a processor for converting the scheduling information on the basis of the code conversion database and for outputting converted scheduling information at designated times on the basis of the scheduling information, and transmission means for transmitting scheduling information that has been converted by the processor to the wireless calling equipment over the communications network.

The transmission server which pertains to this invention is a transmission server for transmitting to wireless calling equipment, on the basis of instructions from user terminals connected to the communications network, data for execution of prescribed processes with respect to the wireless terminals. The transmission server comprises a plurality of modems, a modem driver for driving the plurality of modems, and a processor for selecting the model to be used on the basis of a list indicating use status for the plurality of modems, and for driving the modem that has been selected by the modem driver.

The scheduled data transmission system which pertains to this invention is a scheduled data transmission system comprising registered user terminals that have been previously registered, wireless call equipment for transmitting data for execution of prescribed processes with respect to wireless terminals on the basis of instructions from the registered user terminals, and transmission servers. When there is request for a prescribed process from a registered user terminal, the transmission server executes the prescribed process; where a request for a prescribed process has been made by an unregistered user terminal, the prescribed process is executed in response to the request from the unregistered user terminal within the scope of prescribed restricting conditions.

The scheduled data transmission method which pertains to this invention is a scheduled data transmission method for transmitting data for execution of prescribed processes with respect to wireless terminal on the basis of instructions from user terminals that are connected to a communications network. The scheduled data transmission method comprises a first step in which user-provided data and scheduling information for transmitting this data to a wireless terminal at a designated time is received, a second step in which the data and the scheduling information is stored, a third step in which it is determined from the scheduling information whether there is a designated time, and a fourth step in which the data is transmitted to the terminal at a point in time corresponding to the designated time, and the prescribed process is executed.

The scheduled data transmission method which pertains to this invention is a scheduled data transmission method for transmitting data for execution of prescribed processes with respect to wireless terminals on the basis of instructions from registered user terminals that have been previously registered. The scheduled data transmission method comprises a first step in which a determination is made as to whether there has been a request from a registered user terminal, a second step in which, in the event of a request from a registered user terminal, data for execution of the prescribed process is transmitted, a third step in which, in the event of a request from an unregistered user terminal, the number of accesses by this terminal are counted, a fourth step in which, where the count value falls between a first value and second value, data for execution of the prescribed process in response to the request from the unregistered user terminal is transmitted, a fifth step in which, where the count value exceeds the second value, transmission of data for execution of the prescribed process in response to the request from the unregistered user terminal is suspended, and, a sixth step in which, after suspending transmission, the unregistered user terminal is notified of the suspension, and information pertaining to the terminal registration process is provided, and a seventh step in which, once a prescribed time interval has elapsed, the count value is set to a value below the second value.

BRIEF DESCRIPTION OF THE DRAWINGS

FIG. 11 is an illustrative diagram of fixed message selection in Embodiment 1 of this invention;

FIG. 12 is an example of a scheduled message transmission database in Embodiment 1 of this invention;

FIG. 13 is a conceptual diagram of the mail waiting notification service which pertains to Embodiment 1 of this invention;

FIG. 14 is a conceptual diagram of the registration area change service which pertains to Embodiment 1 of this invention;

FIGS. 15A & 15B are examples of a registration area change database in Embodiment 1 of this invention;

FIG. 16 is a conceptual diagram of the password setup/cancellation agent service which pertains to Embodiment 1 of this invention;

FIG. 17 is an example of a password setup/cancellation database in Embodiment 1 of this invention;

FIG. 18 is an example of a code conversion database in Embodiment 1 of this invention;

DESCRIPTION OF THE PREFERRED EMBODIMENTS

Embodiment 1 of the Invention

Figure 1:
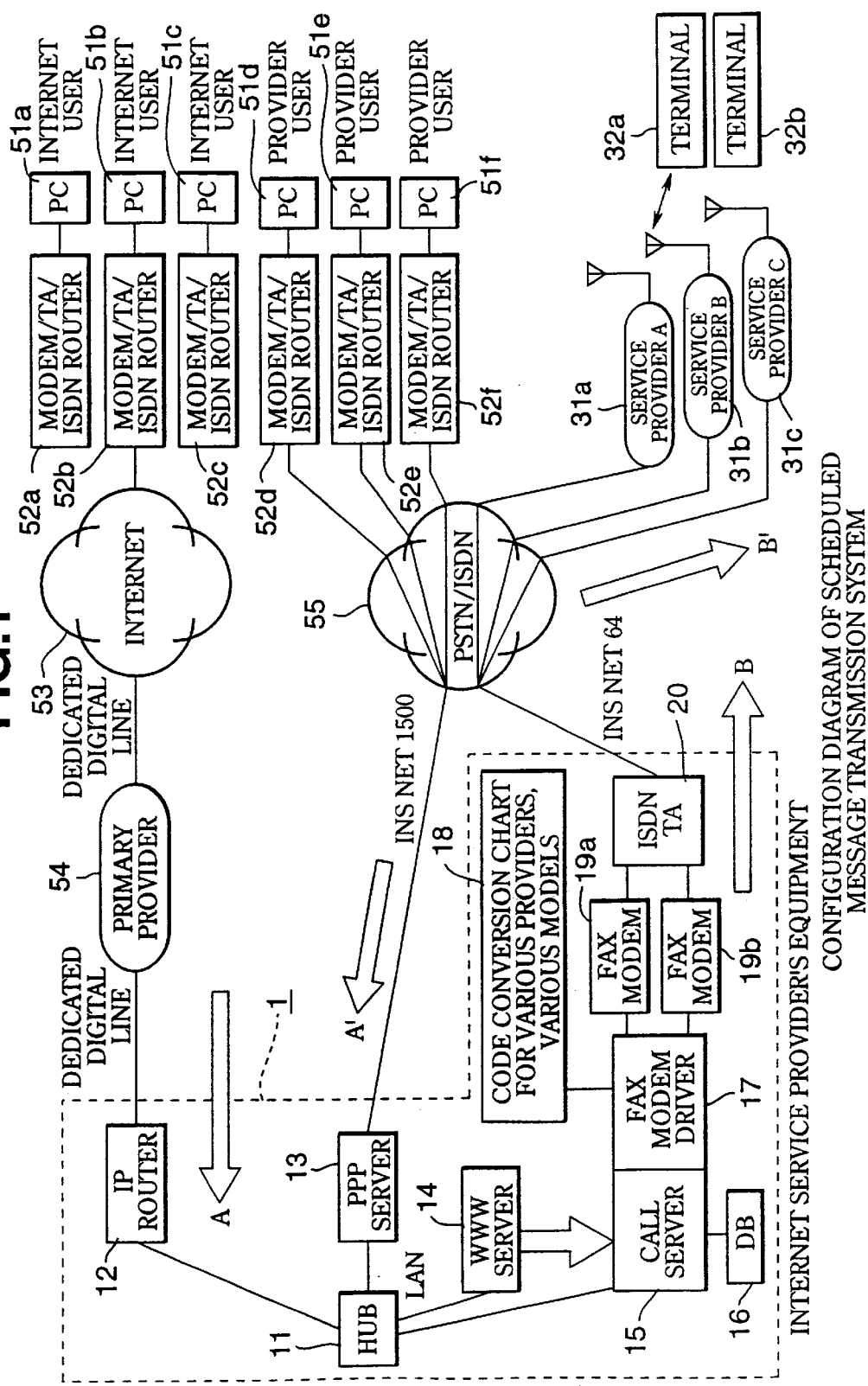
FIG. 1 is a configuration diagram of the scheduled message transmission system which pertains to Embodiment 1 of this invention.

FIG. 1 is a configuration diagram of the scheduled message transmission system which pertains to Embodiment 1 of this invention. The drawing includes three broad areas.

The first area includes users 51*a* through 51*f* who perform processes such as calling a terminal. The first area includes Internet users 51*a* through 51*c* who connect to the system via a so-called Internet provider, and provider users 51*d* through 51*f* who are connected to the system directly through a communications circuit network. As indicated by arrows A and A' in FIG. 1, request signals for the processes described below are transmitted to the Internet service provider's equipment 1.

The second area includes the Internet service provider's equipment 1 for receiving process request signals from users 51*a* through 51*f*, executing the prescribed processes, and transmitting to the terminals 32*a* and 32*b* of each provider command signals for the execution of for the processes described below. As indicated by arrow B in FIG. 1, the command signals described below are transmitted from the second area to the terminals 32*a* and 32*b*.

The third area includes terminals 32*a* and 32*b*, which execute prescribed processes in response to requests from users 51*a* through 51*f*.

Symbols 51*a* through 51*c* indicate Internet users. These are mainly PCs (personal computers). Symbols 51*d* through 51*f* indicate provider users using the Internet service provider's equipment 1. These are also mainly PCs.

Symbols 52*a* through 51*f* indicate modems, TAs (terminal adapters), or ISDN (Integrated Service Digital Network) routers which connect PCs to the Internet 53. Symbol 53 indicates the Internet, to which the modems/TAs/ISDN routers 52*a* through 52*c* are connected. Symbol 54 indicates a primary provider connected with the Internet. The primary provider 54 is linked with the Internet 53 and the Internet service provider's equipment 1 is linked with the primary provider 54 through dedicated digital lines, frame relay network, or packet switching network.

Symbol 55 indicates a PSTN (Public Switched Telephone Network) or ISDN (Integrated Service Digital Network) network to which the modems/TAs 52*d* through 52*f* are connected. The PSTN/ISDN network 55 and the Internet service provider's equipment 1 are linked through an INS (Information Network System) 1500.

Symbol 11 indicates a hub at which LAN cables from workstations, servers, and routers merge. Symbol 12 indicates an IP (Internet Protocol) router. Symbol 13 indicates a PPP (Point-to-Point Protocol) server. Symbol 14 indicates a WWW (World Wide Web) server. Symbol 15 indicates a call server. The IP router 12, PPP server 13, WWW server 14, and call server 15 are connected to the hub 11 through LAN cables.

The call server 15 is connected to a database 16. It generates prescribed command signals in response to call commands from the WWW server 14 and outputs these to a fax modem driver 17. The call server 15 is provided with a clock unit (not shown). PCs and workstations are ordinarily equipped with clock units.

Symbols 17 indicates a fax modem driver. The fax modem driver 17 is connected to a database 18 that stores code conversion tables for various providers and various models. Under the control of the call server 15, the fax modem driver 17 outputs signals for operating fax modems 19*a* and 19*b*. The fax modems 19*a* and 19*b* are connected to the PSTN/ISDN 55 through an ISDN TA 20. Command signals are transmitted to some or all of the service providers 31*a* through 31*c*. With this system, it is possible to provide seamless service at the application level.

Figure 2:
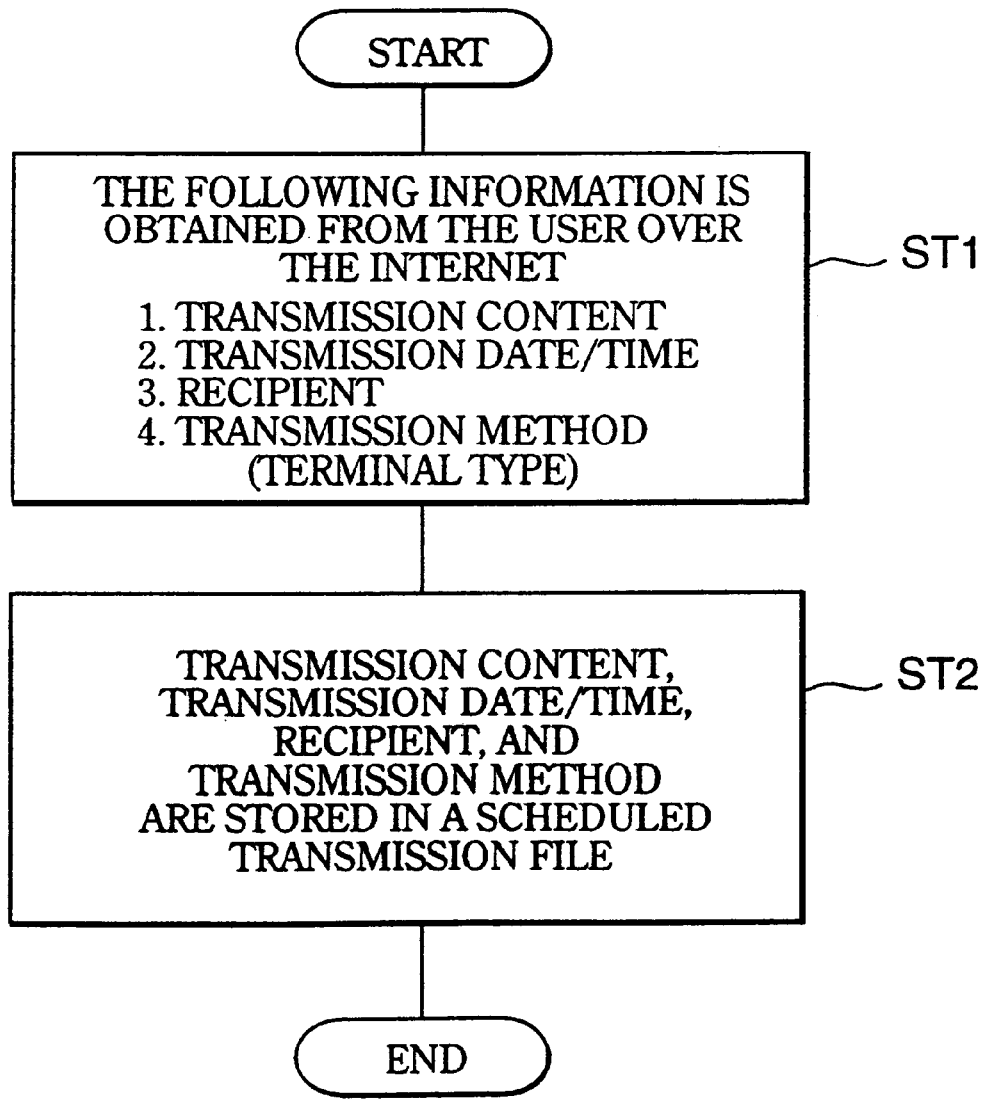
FIG. 2 is a flow chart of the scheduled message reception program which pertains to Embodiment 1 of this invention.

FIG. 2 is a flow chart of the scheduled message reception program. This program is run when there has been a scheduled message reception request from a user. The program comprises a step ST1 in which 1. TRANSMISSION CONTENT, 2. TRANSMISSION DATE/TIME, 3. RECIPIENT, and 4. TRANSMISSION FORMAT (TERMINAL TYPE) are received from the Internet, and a step ST2 in which the TRANSMISSION CONTENT, TRANSMISSION DATA/TIME, RECIPIENT, and TRANSMISSION FORMAT are stored in scheduled transmission files.

Figure 3:
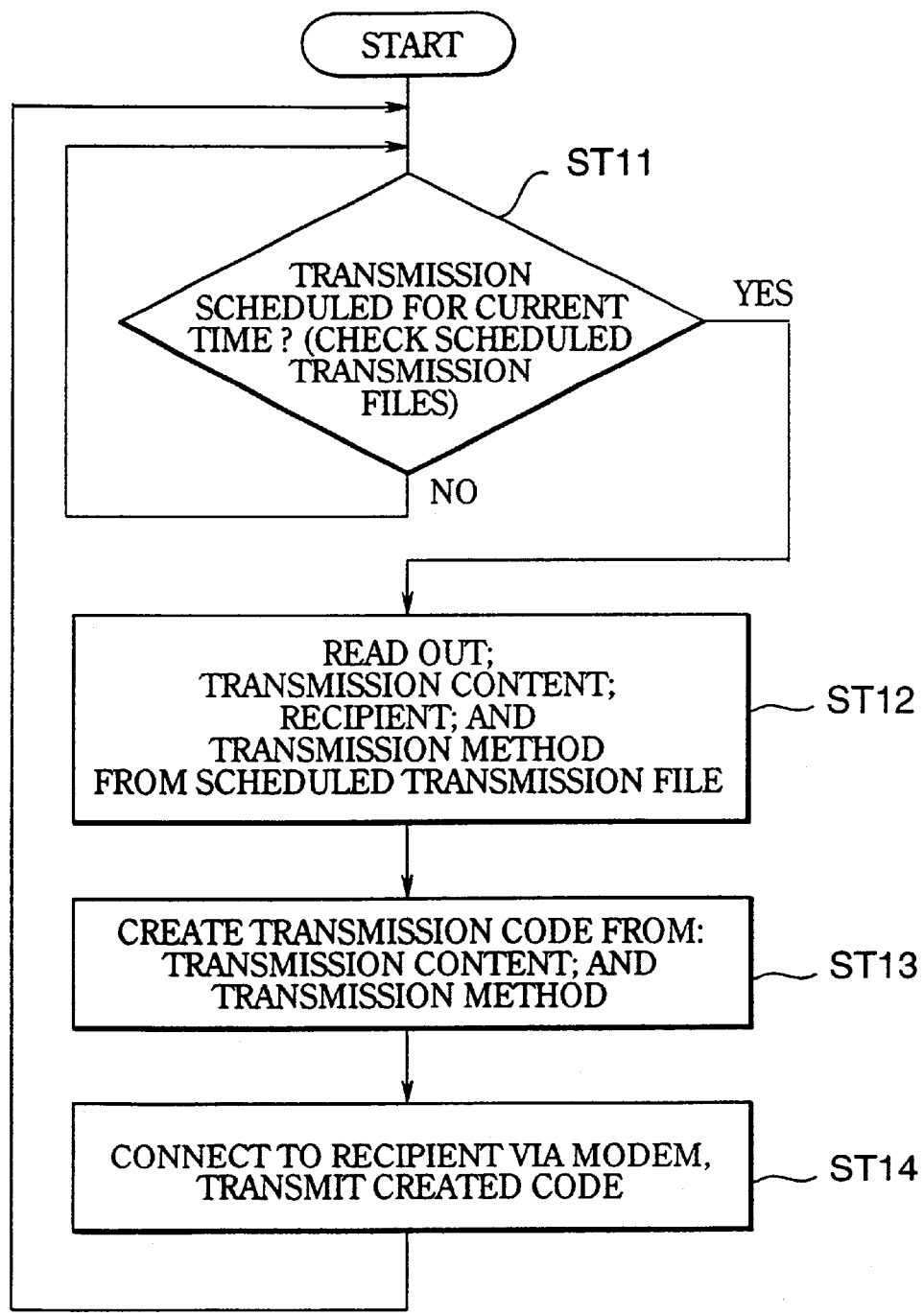
FIG. 3 is a flow chart of the message transmission program which pertains to Embodiment 1 of this invention.

FIG. 3 is a flow chart of a message transmission program. This program is always running or run at fixed intervals. It comprises a step ST11 in which a check is made on the basis of the scheduled transmission files to determine if a transmission has been scheduled for the current time, a step ST12 in which, in the even that a transmission has been scheduled, the TRANSMISSION CONTENT, RECIPIENT, and TRANSMISSION FORMAT are read from the scheduled transmission file, at step ST13 in which a transmission code is created from the TRANSMISSION CONTENT and TRANSMISSION FORMAT, and a step ST14 in which the created transmission code is transmitted from the fax model to the service provider through DTMF signaling.

Figure 4:
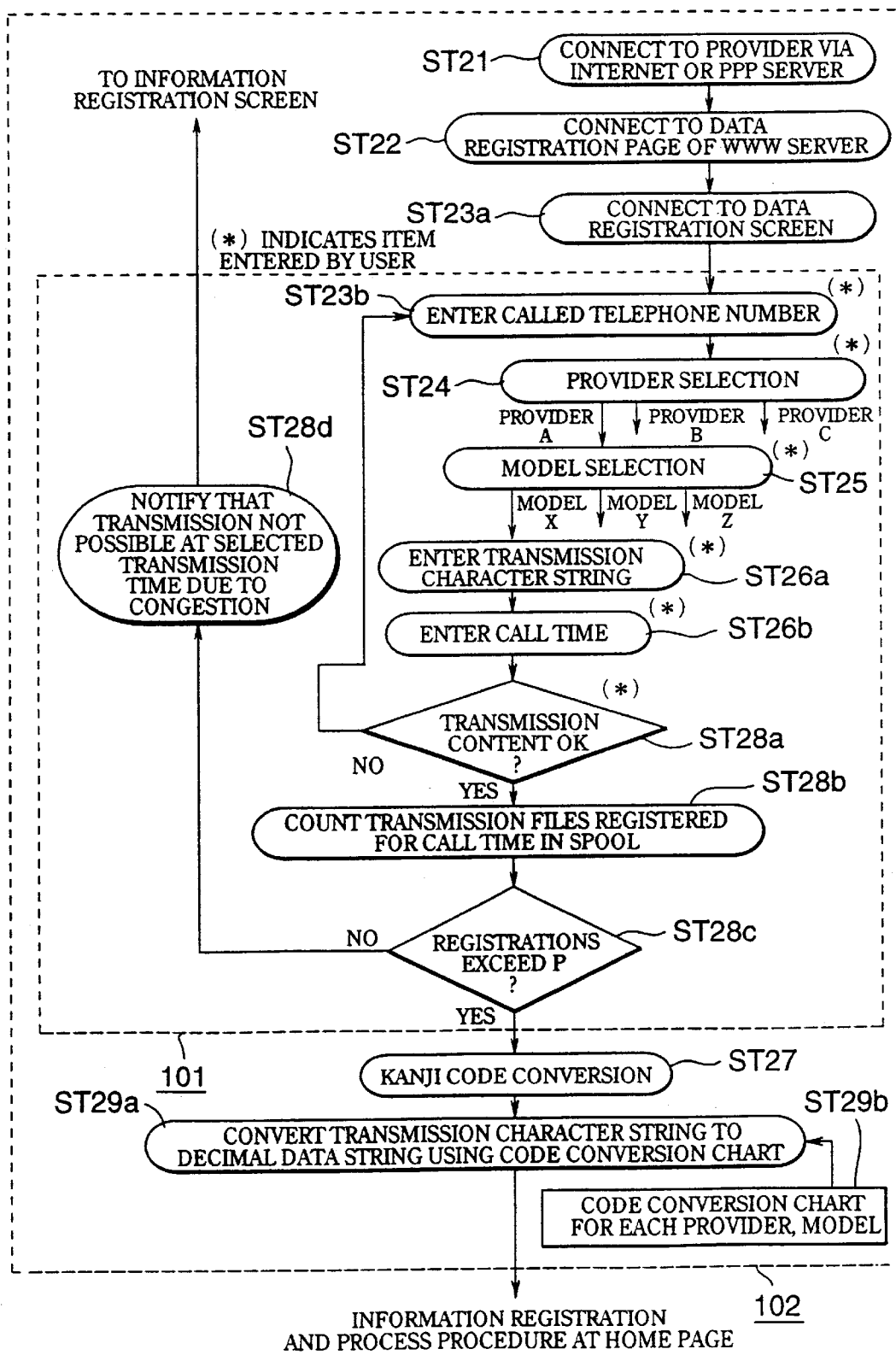
FIG. 4 is a flow chart of all processes of the system of Embodiment 1 of this invention (part 1)
Figure 5:
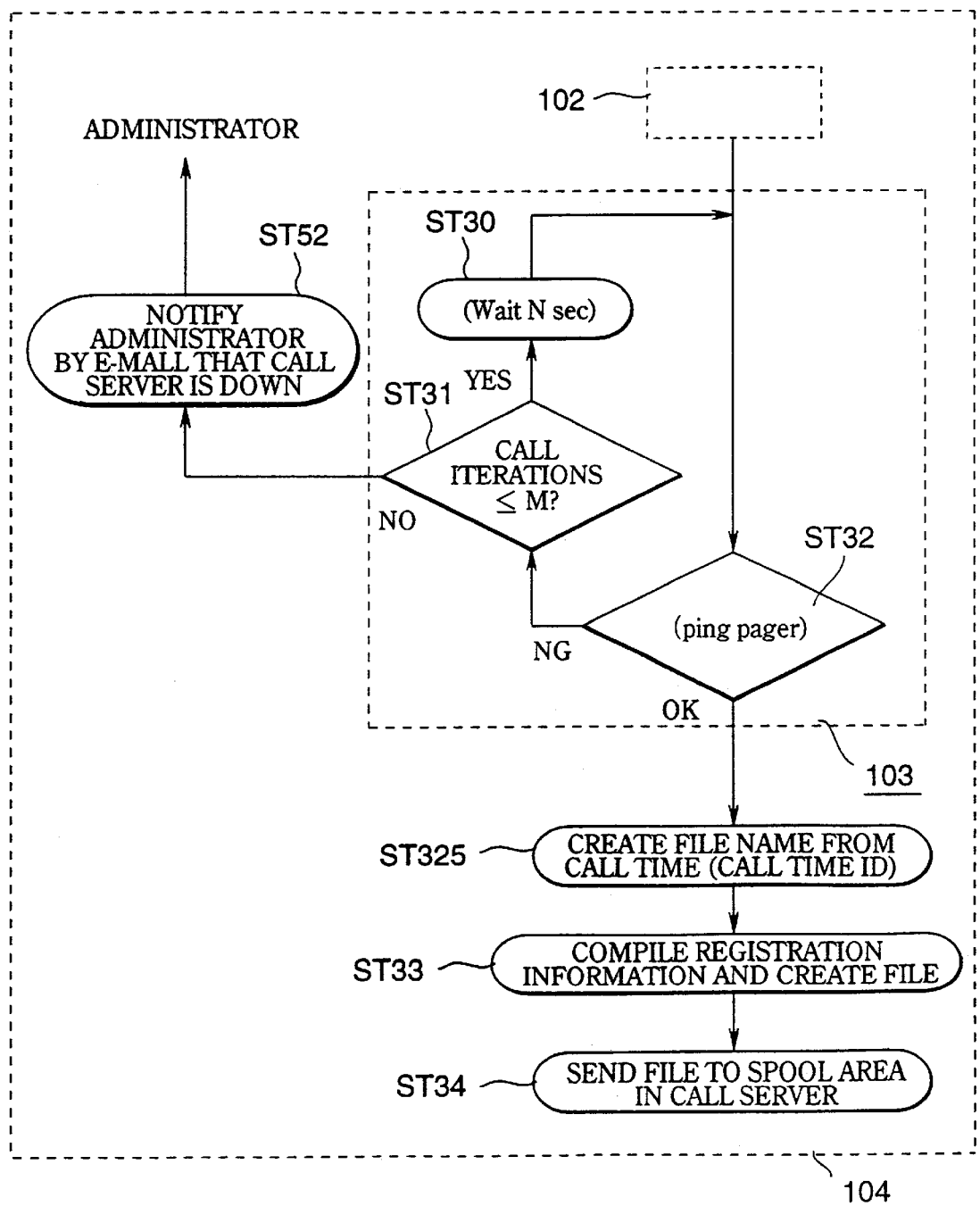
FIG. 5 is a flow chart of all processes of the system of Embodiment 1 of this invention (part 2)
Figure 6:
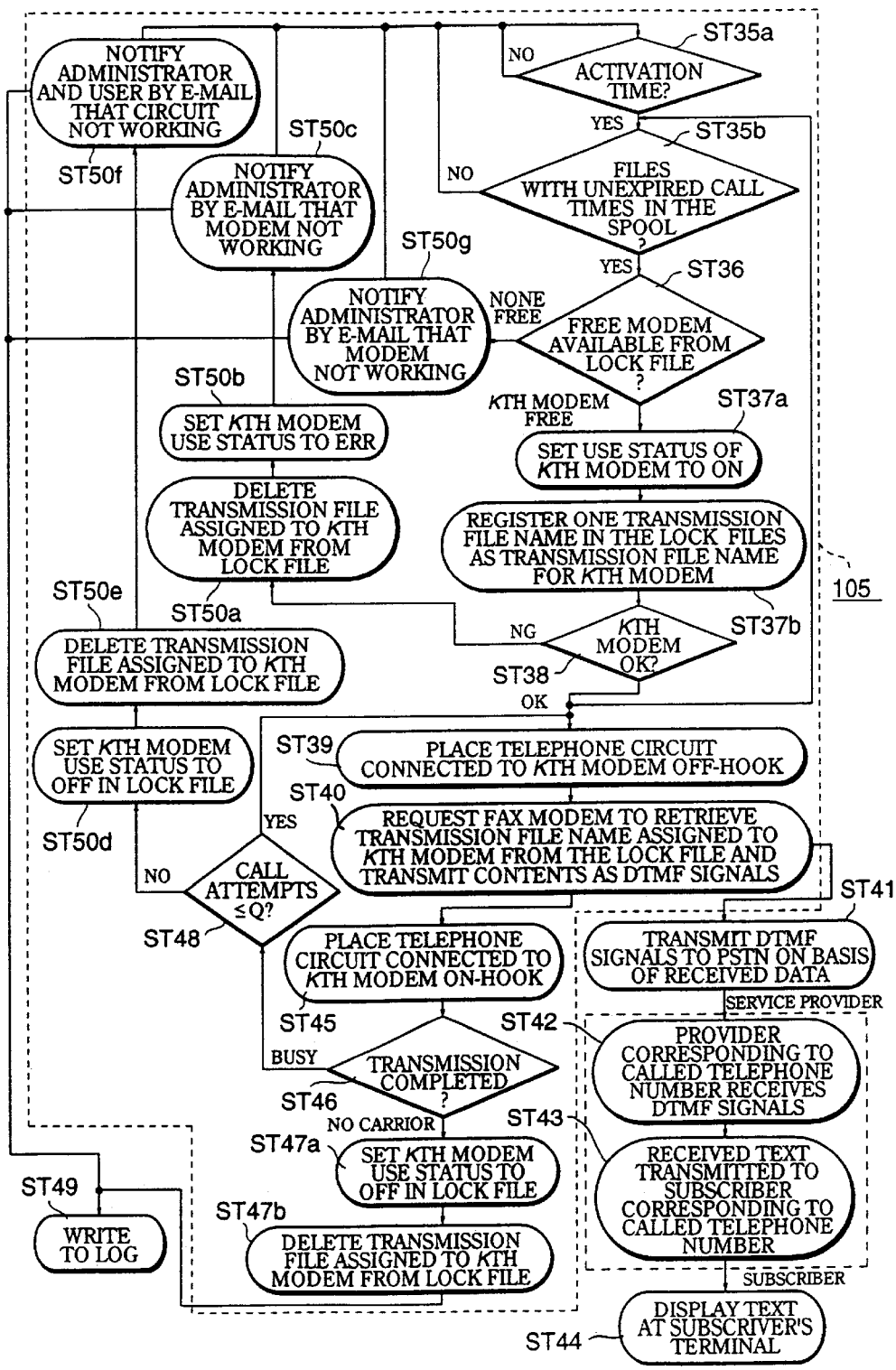
FIG. 6 is a flow chart of all processes of the system of Embodiment 1 of this invention (part 3)
Figure 7:
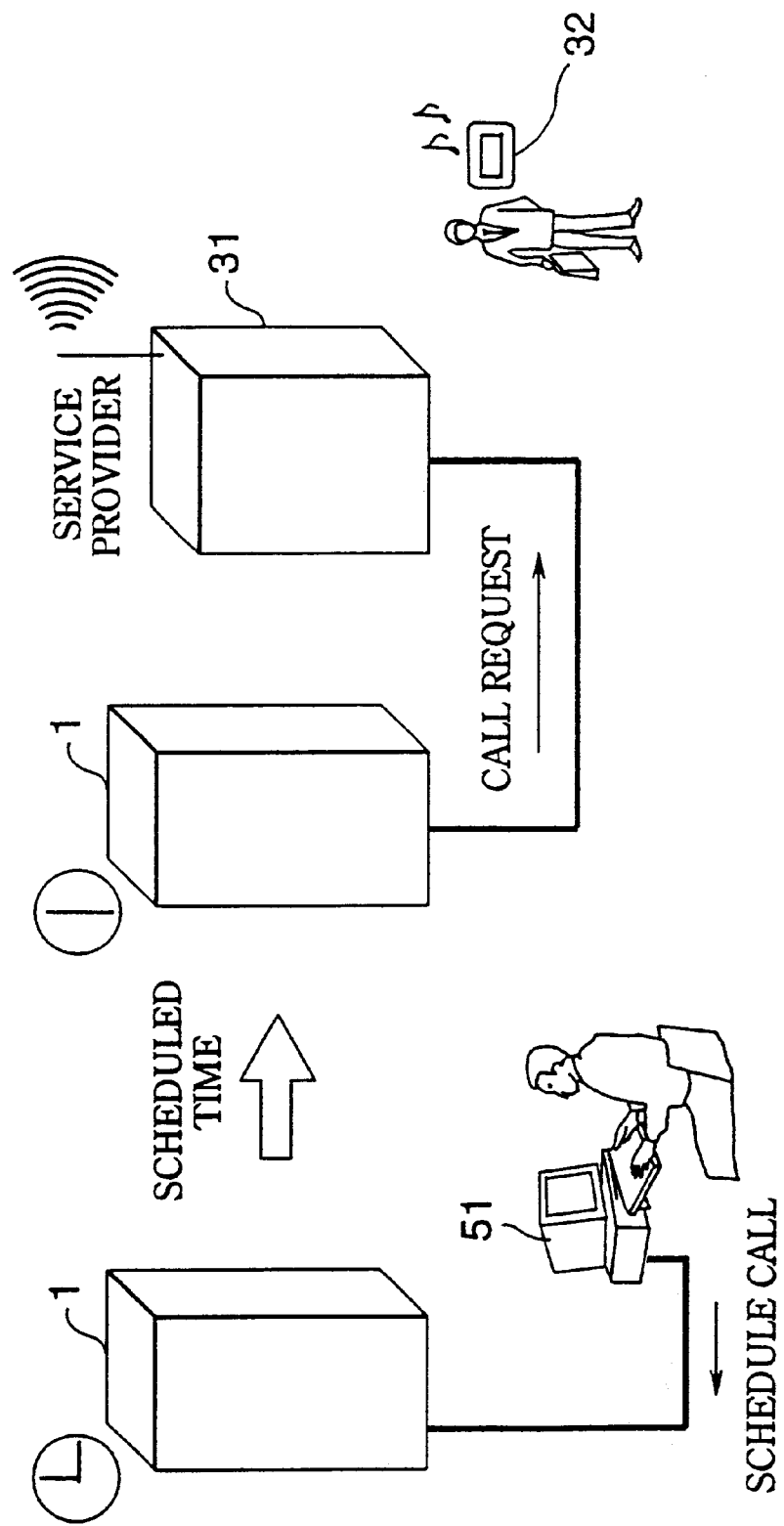
FIG. 7 is a conceptual diagram of the scheduled message transmission service which pertains to Embodiment 1 of this invention.

FIGS. 4 through 6 are flow charts depicting all processes of the system of Embodiment 1 of this invention. FIGS. 4 through 6 include simplified versions of the flow charts in FIGS. 2 and 3. These flow charts comprise three main areas. The first area includes user-executed steps and process steps relating to the WWW server 14. The second area includes process steps for transactions between the WWW server 14 and the call server 15. The third area includes calling process steps for the call server 15. The symbol 101 is assigned to ST23*b* through ST28*d* in FIG. 4, and the symbol 102 is assigned to all processes collectively. The symbol 103 is assigned to ST30 through ST32 in FIG. 5, and the symbol 104 is assigned to all processes collectively. The symbol 105 is assigned to ST35*a* through ST40, ST45 through ST48, and ST50*g* in FIG. 6.

The first area comprises ST21 through ST29. From PC51, a user connects to the provider 1 via the Internet or PPP server (ST21), and connects to the home page on the WWW server 14 (ST22). The user connects to an information registration screen (ST23*a*) and enters a telephone number in this screen (ST23*b*). Next, the provider to which signals will be transmitted is selected (ST24). In FIG. 4, provider A is selected from among providers A through C. ST25 and subsequent processes would be performed analogously if provider B or C had been selected. Next, the recipient device type for displaying the message (a pager, portable data terminal or the like, and more specifically the manufacturer, model number, and so on) is selected (ST25). In FIG. 4, MODEL X is selected from among MODEL X through MODEL Z. ST26 and subsequent processes would be performed analogously if MODEL Y or Z had been selected. Next, the character string for transmission is entered (ST26*a*) and the call time is entered (ST26*b*). A check is then performed to ensure that there is not problem with the transmission contents, for example, that no items have been left blank, that there is not an excessive number of characters in the transmission, and that the character string for transmission is compatible with the selected model (ST28*a*). If there is no problem (Y), the system proceeds to step ST28*b*. If there is a problem (N), the system proceeds to step ST23*b* and the user is prompted to re-enter the information. The number of transmission file registrations at the call time in the spool is counted (ST28*b*). A determination is made as to whether the count (number of registrations) exceeds P (a prescribed integer) (ST23*c*). Here, P reflects the processing capacity per unit of time of the call server at the specified readout time. If the number of registrations is $\leq P$ (Y), the system proceeds to step ST27. If this is not the case (N), it proceeds to step ST28*d*, where notification is made to the effect that transmission cannot take place at the specified transmission time due to congestion. The system then returns to the information registration screen. In step ST27, kanji code conversion is performed. This process utilizes the input kanji code defined in the browser software. The character string for transmission is then converted into a decimal data string referring to the code conversion table (ST29*a*, 29*b*). Since display character codes differ among providers and models, the code conversion table database 18 has a code table matched to each individual transmission recipient. Some providers and models have a standard message format; this can be accommodated as well. The provision of this code conversion table database 18 allows a system user to transmit messages using a procedure analogous to that for ordinary e-mail, without having to be concerned with code conversion for each provider and model.

WWW browsers have a function whereby character strings entered by the user are converted to the same kanji code as that for the HTML files received by the browser and are then transmitted to the server. Accordingly, a known kanji code is obtained regardless of the server-input kanji code, so kanji code conversion is a relatively simple matter.

The following basic relationship exists among users, browsers, and WWW servers. Character data entered by a user is converted to a URL by the browser software so that a WWW server can be accessed. HTML data from the WWW server is converted by the browser software and displayed on the screen at the user terminal.

The process now proceeds to FIG. 5. A check is made to ascertain whether the call server 15 is active (103). Connection with the call server 15 is verified through a ping command (ST32). If the server is not active (NG), a check is made to determine if the number of call attempts is equal to or less than a predetermined number of iterations M (ST31); if this the case (Y), ST32 is executed again after waiting a prescribed number of seconds N. If this is not the case (N), the user is notified of the transmission failure through e-mail (ST52). If, in ST32, it is determined that the call server 15 is active (OK), a file name is created using the call time (ST325). An example file name is (call time)+ID. In this way, a file to be transmitted can be called up easily. Next, registration information is collected and put into a file (ST33). The file comprises, for example, the "called telephone number" and "transmission character string". This file is transmitted to the spool area of the call server 15 (ST34).

The process now proceeds to the call process shown in FIG. 6. The process shown in FIG. 6 is initiated at fixed intervals, for example, every five minutes, by a timer. First, it is determined whether an initiation time has arrived (ST35*a*). If this is the case (Y), the system proceeds to step 35*b*; if it is not the case (N), the system goes to standby. Next, a determination is made as to whether there are any files with unexpired call times in the spool (ST35*b*). If no such files are present (N), the system goes to standby; if there are (Y), a search for a free modem from the lock file is made (ST36). If no modem is free, the system proceeds to step ST50*g* and the administrator is notified by e-mail that there is an insufficient number of modems. If there is a free modem, the system proceeds to step ST37*a*.

A example of a lock file list is given below.

| No. file | Device name name | Use status | Transmission |
| --- | --- | --- | --- |
| 0 | /dev/ttya | off | |
| 1 | /dev/ttyb | on | call time 1, ID 1 |
| 2 | /dev/tty01 | off | |
| 3 | /dev/tty02 | on | call time 2, ID 2 |
| 4 | /dev/tty03 | on | call time 3, ID 3 |
| 5 | /dev/tty04 | off | |
| 6 | /dev/tty05 | off | |

A single device name is assigned to each fax modem. The use status indicates whether the fax modem is in use (on) or not in use (off). When a modem is in use (on), the name of the file being transmitted by the modem is also indicated. The use of transmission file name data prevents the same file from being sent twice. Since the file name format is (call time)+ID, an examination of the file name allows it to be readily determined if files are being transmitted in correct correspondence to transmission times.

Next, the use status of some kth suitable free modem from the lock file list (for example, that with the lowest number) is set to "on" (ST37*a*), and one of the transmission file names is registered in the lock file as the transmission file name for the kth modem (ST37*b*). Next, a determination is made as to whether the locked modem can be used (ST38). If NG, the kth modem transmission file name is deleted from the lock file (ST50*a*), and the use status of the kth modem is set to "err" (error) (ST50*b*). The administrator is then notified by e-mail that the modem is not working (ST50*c*). If OK, the telephone circuit to which the kth modem is connected is placed off-hook (ST39). The fax modem is requested to retrieve the transmission file name assigned to the kth modem from the lock file and to transmit the contents thereof through DTMF (Dual-tone Multi-frequency) signaling (ST40). The data sent to the fax modem at this time is a combination of "ATDT+called telephone number" (ATDT0355418280, for example) and a transmission character string in the form of decimal data (for example, #2#23847 . . . #2; #2 is the pager control code). The ATDT°telephone number and the transmission character string are sent, and on the basis of the received data DTMF signals are transmitted to the PSTN (ST41). The provider corresponding to called telephone number receives the DTMF signals (ST42). The received text is then transmitted to the subscriber corresponding to the called telephone number (ST43). ST42 and 43 represent processes performed by the service provider 31. The text is then displayed at the terminal 32 (ST44).

Following ST40, the processes of ST45 through ST49 are executed. The telephone circuit to which the kth modem is connected is placed on-hook (ST45). A determination is made as to whether a connection was established (ST46); if the line was busy, a determination is made as to whether the number of call attempts is equal to or less than a predetermined number of iterations Q. If this is the case (Y), the process of ST39 and the subsequent steps is repeated; if this is not the case (N), the kth mode use status is set to off in the lock file (ST50*d*) and the transmission file assigned to the kth modem is deleted from the lock file (ST50*e*). The administrator and user are then notified by e-mail that the circuit is not working (ST50*f*). Alternatively, where transmission has been successfully completed (NO CARRIER), the kth modem use status is set to off in the lock file (ST47*a*) and the transmission file assigned to the kth modem is deleted from the lock file (ST47*b*). A log of the event is then written (ST49). A log is also written when a free modem cannot be found in ST36, when the modem is NG in ST38, or when the number of call attempts exceeds N iterations in ST48.

A determination as to whether a call has been successfully made merely indicates that the call server has successfully sent the message to the call provider, and provides no indication as to whether the message has actually reached the called pager. For example, the pager may be outside of the area, or, while a connection was established, a message such as "BUSY, PLEASE TRY AGAIN LATER." may have been returned due to conditions at the recipient's side. The fax modem cannot recognize messages of this type, and mistakenly assumes that a successful transmission has been made. Process such as those described below could be used to solve this problem.

The first method is one whereby the fax modem side is provided with voice recognition capability so as to be capable of ascertaining message content. In the event that a message cannot be sent, a process analogous to that for the busy scenario described earlier would be executed. This method has the advantage of being implementable through additional equipment at the provider side only.

The second method is one whereby a prescribed signal (tone signal or the like) is returned from the recipient instead of a "BUSY, PLEASE TRY AGAIN LATER" message, and this signal is detected by at the fax modem side. This method would require modifications at the provider side, but has the advantage that the equipment required at the provider side is fairly simple.

The operation of Embodiment 1 of this invention will now be described referring to FIGS. 7 through 18. In the following discussion, reference will be made to FIGS. 1 through 5 as well where appropriate.

(1) Message Transmission Scheduling Service

As shown in FIG. 6, when a user schedules a message transmission with the provider 1 through PC 51, the provider sends a call request to the service provider 31 at the scheduled time, and the prescribed message is displayed on the terminal 32. Of course, if the scheduled time has been set to "IMMEDIATELY," the message is transmitted immediately (or within one minute). With this system, the transmission time can be set arbitrarily, allowing the message to be sent at some time deemed favorable for the sender or the recipient. For example, the message could be transmitted at a time when the recipient is anticipated to have moved to a prescribed geographical location. This service offers significant advantages, such that messages can be transmitted over the Internet, which is much easier than making a telephone call (the process can employ the PC FEP, is visible, and so on); that it can be adapted to any model; and that complicated code conversions are performed automatically.

Figure 8:
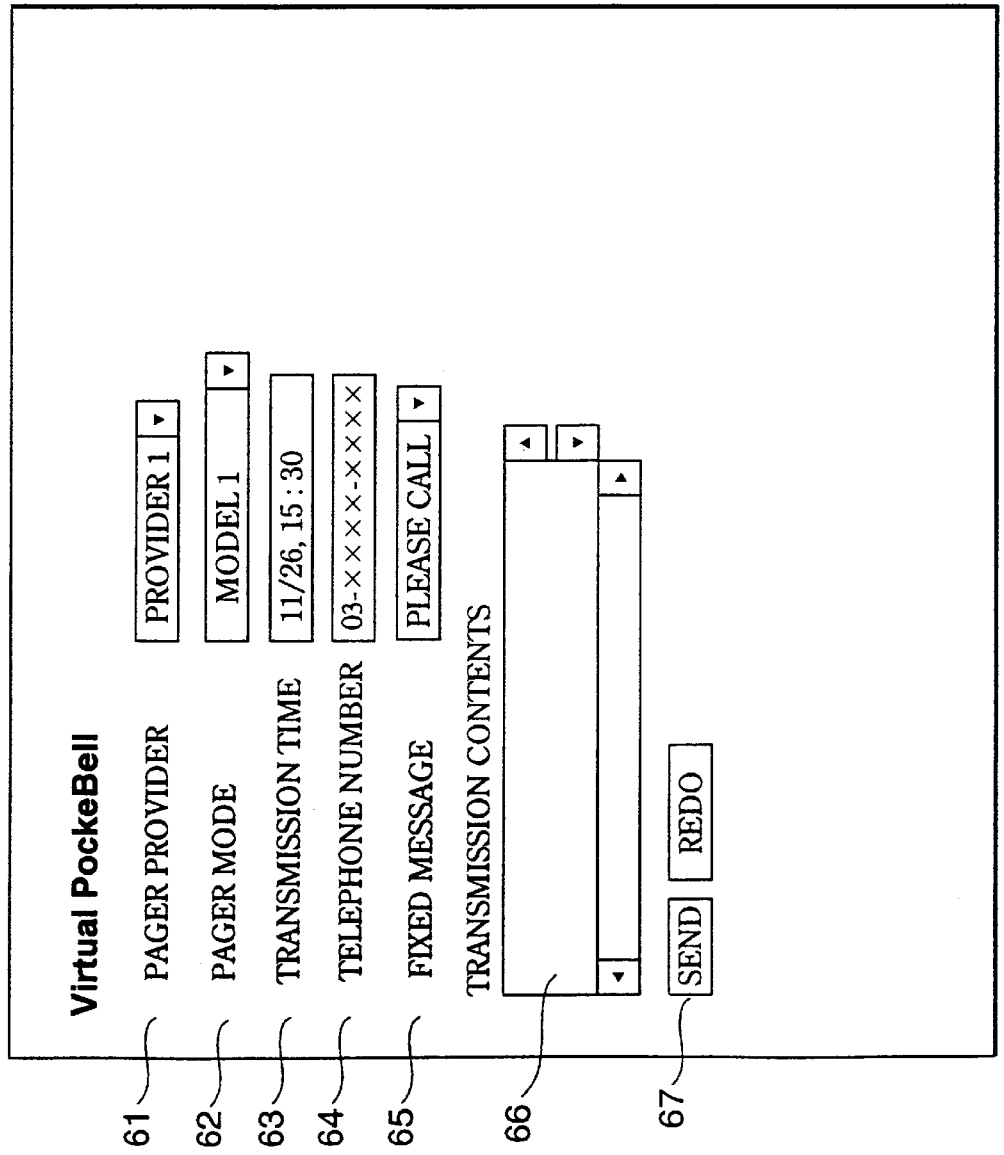
FIG. 8 shows dialogs for setting transmission parameters in Embodiment 1 of this invention.

A specific example of user operation will be described referring to FIGS. 8 through 11. FIG. 8 show dialogs for default or previously set transmission parameters. Symbol 61 indicates a box showing the pager provider, symbol 62 indicates a box showing the pager model, symbol 63 indicates a box showing the transmission time, symbol 64 indicates a box showing the telephone number of the recipient, symbol 65 indicates a box showing a fixed message, symbol 66 indicates a box showing the transmission content, and symbol 67 indicates switches for selecting whether to send the dialog contents or re-enter the information. For boxes 61, 62, and 65, clicking on the switch located to the right thereof displays a pull-down menu which allows one to select the appropriate item from among the displayed items. The status depicted in FIG. 8 corresponds to the status at completion of ST21 through ST23 in FIG. 4.

Figure 9:
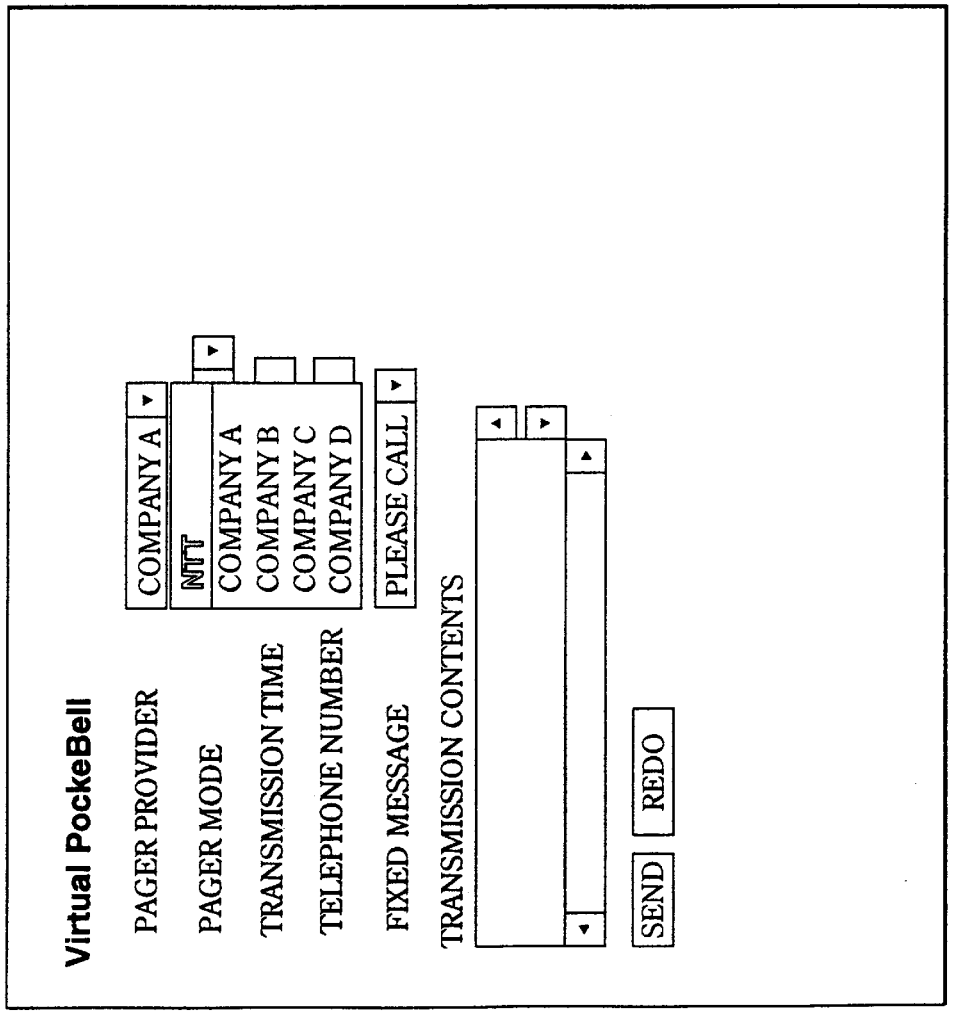
FIG. 9 is an illustrative diagram of pager provider selection in Embodiment 1 of this invention.

FIG. 9 depicts the screen during pager provider selection. Any of the providers COMPANY A through COMPANY D displayed on the pull-down menu can be selected. In FIG. 9, COMPANY A has been selected. The status depicted in FIG. 9 corresponds to the process of ST24 in FIG. 4.

Figure 10:
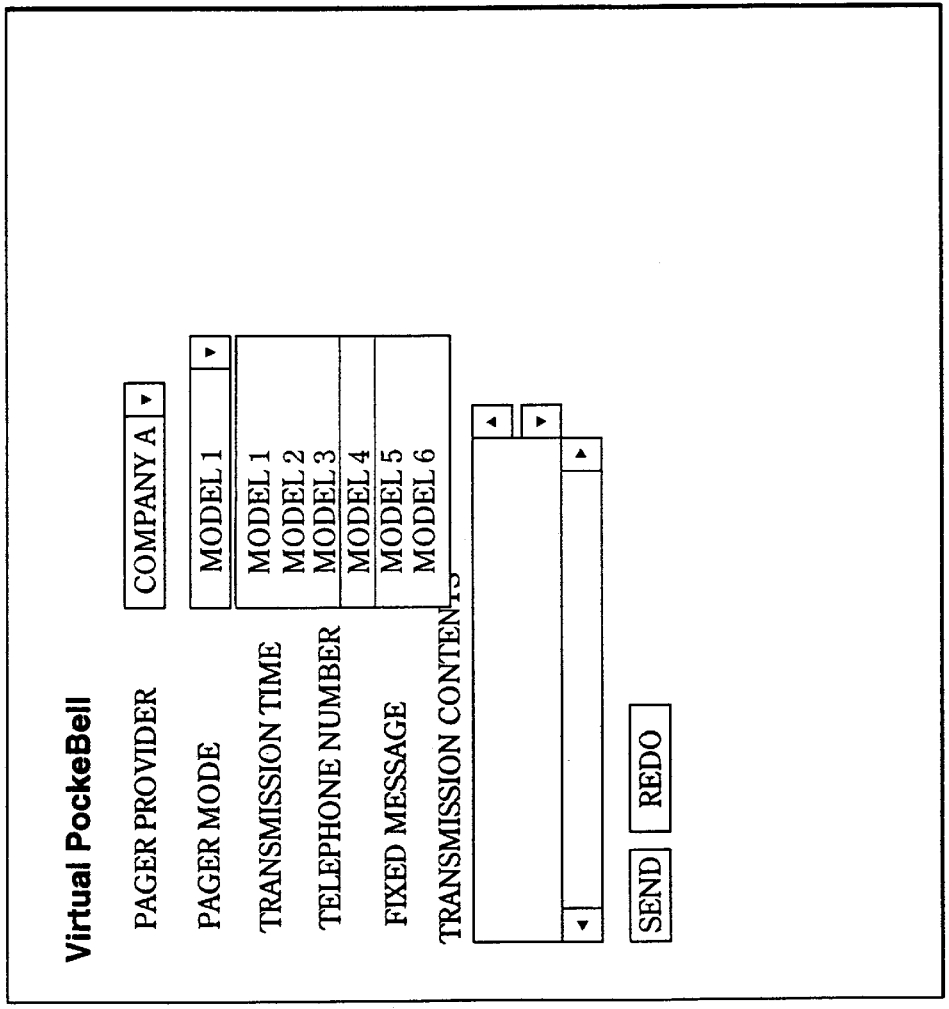
FIG. 10 is an illustrative diagram of pager model selection in Embodiment 1 of this invention.

FIG. 10 depicts the screen during pager model selection. Any of the models MODEL 1 through MODEL 6 displayed on the pull-down menu can be selected. In FIG. 10, MODEL 4 has been selected. The status depicted in FIG. 9 corresponds to the process of ST25 in FIG. 4. Subsequently, the transmission time and recipient's telephone number are entered from the keyboard of the PC 51. This corresponds to ST26 in FIG. 4.

FIG. 11 depicts the screen during fixed message selection. Any of the messages "PLEASE CALL," "WILL BE LATE," "THERE'S BEEN A CHANGE," "EVENT CANCELED," "GOING HOME," "PHONE MESSAGE WAITING," and "WHAT ARE YOU DOING NOW?" displayed on the pull-down menu can be selected. In FIG. 11, "GOING HOME NOW" has been selected. This corresponds to ST26 in FIG. 4. Fixed messages are preset. The user can record a desired fixed message, or use a standard format predetermined for a particular provider and model.

To send a message other than one of the fixed messages, the transmission contents are entered separately in box 56.

Upon completing entry, clicking the "SEND" switch issues a call command to the call server 15, initiating the process. The process of ST29 and subsequent steps is initiated.

The database 16 contains, for example transfer data for each date/time like that shown in FIG. 12. When the prescribed time is reached, the data is fetched and sent. The items shown in FIG. 12 are entered in the manner described earlier. The recipient provider and recipient model must be entered because text codes differ. Using the code conversion database shown in FIG. 18, the appropriate code conversion is made for each particular recipient provider and recipient model (ST29a, 29b in FIG. 4)

It would be possible to charge a fixed fee for system services.

As shown in FIG. 13, it is also possible to send forward an e-mail to a pager or PHS. By setting the message and time in advance, the call can be made at the desired time. This is analogous to the process depicted in the flow charts in FIGS. 4 and 5, with the exception that the message input step is omitted.

In the configuration shown in FIG. 13, it would be possible to provide a filtering function for selecting e-mail for notification. For example, it would be possible to forward only e-mail from a designated sender(s), to forward only e-mail with a designated title(s), to forward only e-mail received or sent within a prescribed date and time frame, to forward only e-mail in text format, or forward only e-mail whose size is within a prescribed range. This determination could by made in ST28 in FIG. 4 or in proximity thereto.

(2) Registration Area Change Service

As shown in FIG. 14, a user can pre-register a scheduled area change with the provider 1 from the PC 51 in order to automatically change the registration area at the prescribed time. For example, since pager calling areas are predetermined, a pager moving from Sapporo to Tokyo would have to be re-registered in order for calls to be possible. However, changing the registration area prior to the move would disable the pager from receiving calls. This system allows the registration area to be changed at some appropriate time in advance, as well as allowing verification messages to be sent to both areas when the registration area is changed so that the user to be notified of the change in registration area can received the information regardless of the area in which he or she is located. Expanding pager functionality to include a transmission function would make it possible to verify the user area and make any required corrections to the registration area. A message could be attached at this time as well.

The operation flow chart for this system is analogous to the flow chart is FIGS. 4 and 5, but the contents of the database 16 are different. An example of the database 16 used for this service is depicted in FIG. 15. FIG. 15(a) shows a database for changing the registration area from Sapporo to Tokyo at a designated change date and time. The VERIFY YES/NO is marked YES, so area verification will be performed. Specifically, messages will be sent to both the Sapporo and Tokyo areas, it will be verified that these have been transmitted correctly, and it will be determined through the pager in which area the recipient is located, or if the recipient is located in neither area. This verification can be disabled.

FIG. 15(b) shows a database for combined message transmission. The message "HAVE A GOOD TRIP TO TOKYO" must be transmitted while the recipient is still in Sapporo, so the date and time are set to a time when the recipient is sure to be Sapporo. Similar, the message "WELCOME TO TOKYO" will be scheduled to be transmitted at some time at which the recipient is sure to be in Tokyo. The travel date and time is selected at the date and time for the registration area change. 1. HAVE A GOOD TRIP TO TOKYO" PAGE REQUEST, 2. REGISTRATION AREA CHANGE, and 3. "WELCOME TO TOKYO" PAGE REQUEST, shown in FIG. 14, can be processed at virtually the same time or at different times, and the information transmitted to either area. In this way, types of verification message displayable by the pager can selected.

Where it is not certain in which area the recipient is, but it is certain that the recipient is in one or the other of the areas, verification messages can be sent to both areas.

(3) Password Setup/Cancel Agent Service

As shown in FIG. 16, the user can set up or preregister cancellation of a password with the provider 1 using PC 51, allowing the password to be set up or canceled automatically at some prescribed time. The password service is a service whereby a four-digit password is selected in order to restrict individuals who can receive messages at a terminal. A password setup, change, or cancellation can be made at any time. Verification messages can be selected as appropriate for each pager type. The verification message can be disabled.

The operation flow chart for this system is analogous to the flow charts in FIGS. 4 and 5, but the contents of the database 16 are different. An example of the database 16 used for this service is depicted in FIG. 17. FIG. 17 shows a database for setting up (the password can be selected during setup) or cancelling a password at some prescribed change date and time. When setting up a password, the verification message "SET UP PASSWORD" is displayed at the terminal 32; when cancelling, the verification message "CANCEL PASSWORD" is displayed at the terminal 32.

The system of Embodiment 1 of this invention offers the following merits.

(1) This system can be organically linked to pagers, PHS, and various other data terminal used conventionally, and with the Internet and other computer networks.

(2) This system allows transmission times to be set arbitrarily so that messages can sent at times deemed convenient for the sender or the recipient, allows registration areas to be changed, and allows passwords to be set up or canceled. For example, if someone will not be in, this person could send a message such as, "I WON'T BE IN, STAND IN FOR ME" to a recipient, or to send a message at some time when the recipient is expected to have moved to a prescribed geographical area.

(3) This service can send messages over the Internet, so the procedure is simpler than a telephone call. Code conversion can be performed by the call server 15, which has the advantage of allowing complicated code conversions for any model to be performed automatically.

(4) This service allows a transmission to be made at any time, making it easy to compensate for time zone differences, particularly in the case of overseas communications.

Embodiment 2 of the Invention

Embodiment 2 of the invention will now be described. The services provided in Embodiment 1 of the invention may in some cases be offered by a provider as special services for which there is a charge. In such cases, services can be accessed only by certain registered members; requests by non-members for such services are not accepted by the system.

However, a system may be designed so that even non-members can access services under certain prescribed conditions Embodiment 2 of this invention provides a system for this purpose.

Figure 19:
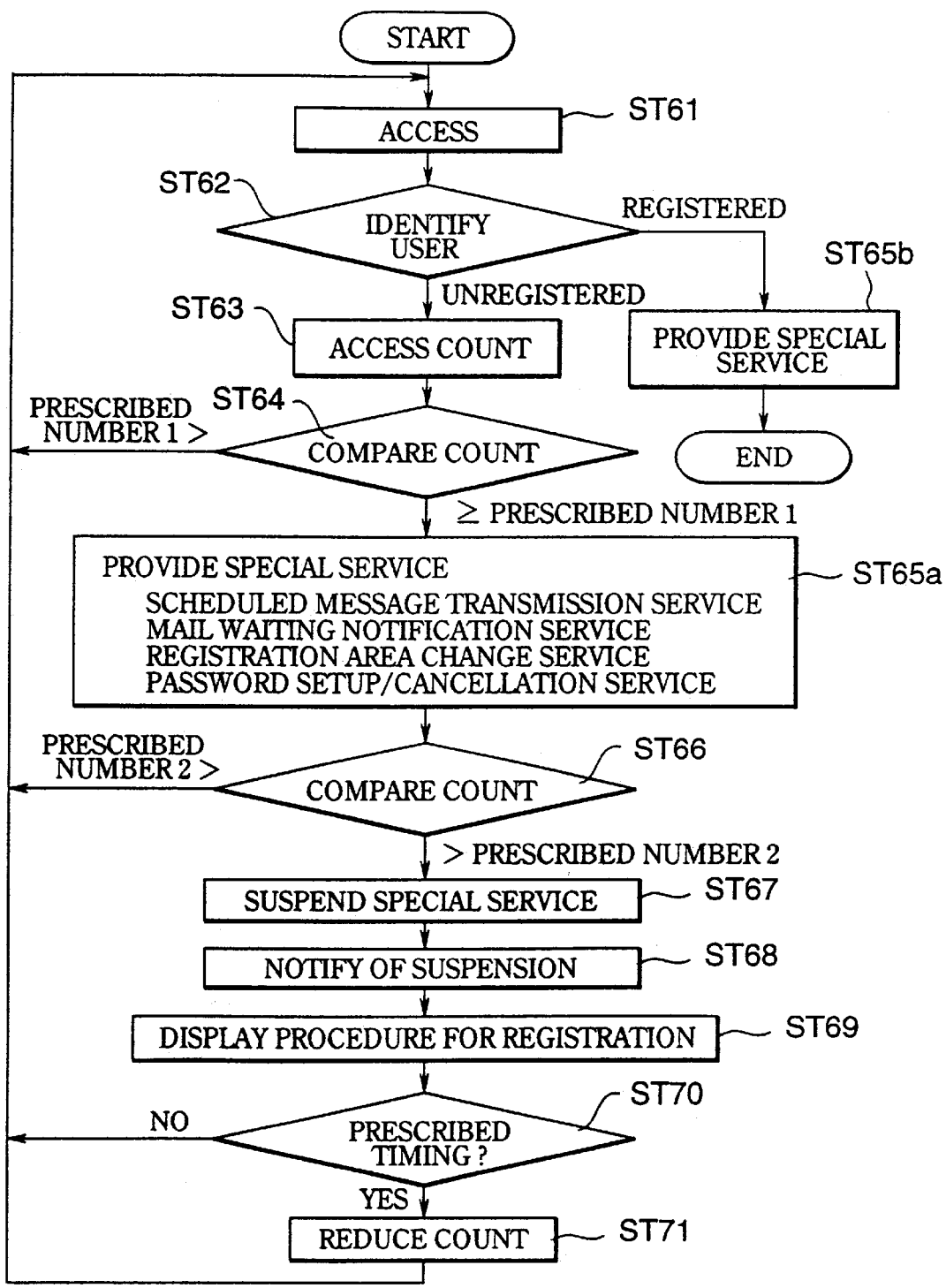
FIG. 19 is a flow chart of all processes of a system of Embodiment 2 of this invention.

FIG. 19 is a flow chart of the process in this system. This process is performed by the call server 15, for example.

The provider 1 is accessed by users of provider 1 through an IP router 12 or PPP server 13 (ST61).

The accessing user is identified (ST62), and if the user is registered, the special service is provided (ST65b), while if the user is not registered, the number of times that the service is accessed by this user is counted (ST63). A user accessing a service can be identified from the user address, host name, and so on.

The count is compared with a predetermined PRESCRIBED NUMBER 1 (ST64). If PRESCRIBED NUMBER 1>COUNT NUMBER, the system returns to ST61. If this is not the case, it proceeds to the next step. This PRESCRIBED NUMBER 1 is a value that allows the provider 1 to identify users accessing services above a certain frequency. Where a special service is provided to frequent users only, the value of PRESCRIBED NUMBER 1 can be quite large; where a special service is provided to all users, the value of PRESCRIBED NUMBER 1 can be small (0, for example).

The special service is provided (ST65a). Specific examples are the scheduled message transmission service, mail waiting notification service, registration area change service, and password setup/cancellation service described in Embodiment 1 of the invention.

The count is compared with a predetermined PRESCRIBED NUMBER 2 (ST66). If PRESCRIBED NUMBER 2>COUNT NUMBER, the system returns to ST61. If this is not the case, it proceeds to the next step. This PRESCRIBED NUMBER 2 is a value that allows one to limit the number of times that an unregistered user can access a special service. To permit a large number of accesses by unregistered user, the value of PRESCRIBED NUMBER 2 can be quite large; in the opposite case, it can be small. It is possible to set PRESCRIBED NUMBER 1 and PRESCRIBED NUMBER 2 to the same value for all users, or to set different values for different users.

It would also be possible to compile a list of access counts for each user, and to broadcast to the most frequent users a message to the effect that "SINCE YOU ACCESS THIS SERVICE FREQUENTLY, IT WOULD BE TO YOUR ADVANTAGE SIGN UP WITH THE PROVIDER."

When an unregistered user has accessed a special service in excess of the limit established for all unregistered users (PRESCRIBED NUMBER 2), the following process is executed to notify the user that the service in question is provided.

The special service is suspended (ST67), and an e-mail to this effect is sent to the user (ST68). The user is also sent an e-mail indicating the registration process required to subscribe to the service in question (ST69. This is in order to prompt the user to register with the provider 1.

Next, a determination is made as to whether a predetermined time interval has passed since suspension of the service (ST70). If this time has not elapsed (NO), the system returns to ST61; if it has elapsed (YES), the count is reduced (ST71). Reducing the count allows the user to again access the special service even if this user has not registered. From the point of view of the user, a complete denial of the service might make the user disinclined to access the provider 1. In order to hold the interest of the user, it would be possible to re-enable access to the special service one a prescribed period of time has elapsed. The user could informed of this fact in the notification of suspension (ST68).

The system of Embodiment 2 of this invention offers the following merits.

(b 1) This system allows both registered users and unregistered users to access special services within a given scope. The fact that it can be determined if an unregistered user has registered after "test-driving" a special service is extremely convenient.

(2) The extent to which access by an unregistered user will be enabled can be set arbitrarily, there by reducing the burden on the provider while allowing the special service to be accessed by a large number of users.

(3) Sending a registration form to a user allows the user to register easily. From the provider's standpoint, this promotes user registration.

Depending on service content, the extent of access can be set in a finely differentiated manner. For example, distinctions could be made between corporation and individuals, by age, by sex, or by occupation.

Figure 20:
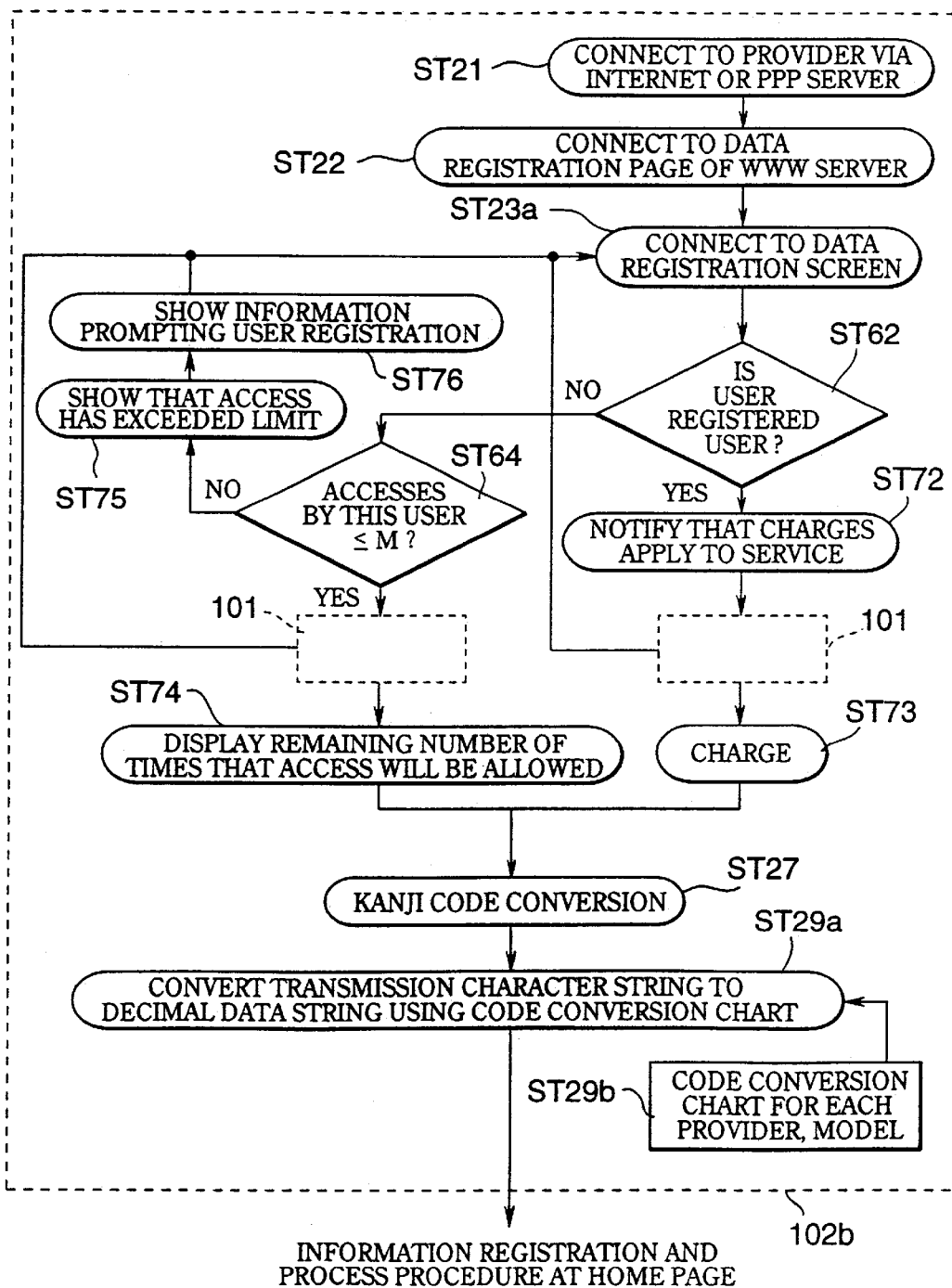
FIG. 20 is a flow chart of all processes of another system of Embodiment 2 of this invention.

Another flow chart of the process in Embodiment 2 of this invention is presented in FIG. 20. In the drawing, symbol 101 corresponds to the area of processes in the WWW server in FIG. 4. In the process depicted in FIG. 20, if a user happens to be a registered user (Y in ST62), the user is notified that charges apply to the service (ST72), and the system proceeds to the process indicated by symbol 101 for entering the telephone number and other information. Upon completion of the process indicated by symbol 101, the charges are computed (ST73). If the user is not a registered user (N in ST62), a determination is made as to whether the number of accesses by the user is equal to M or less (ST64); if M or less (Y), the system proceeds to the process indicated by symbol 101 for entering the telephone number and other information. Once the process indicated by symbol 101 has been completed, the remaining number of time that access will by allowed is displayed (ST74). If not M or less (N in ST64), an indication that the access limit has been exceeded is displayed (ST75), and information prompting the user to register is displayed (ST76). The system then returns to ST23a.

In this way, the present invention is provided with user terminals connected to a communication network, with wireless calling equipment for transmitting data for execution of prescribed processes with respect to wireless terminals on the basis of instruction from the user terminals, and with transmission servers; the user terminals transmit to the transmission servers scheduling information for transmitting data to the wireless terminals at specific times, and the transmission servers send the data at the specified time on the basis of the scheduling information to the wireless calling equipment so that prescribed process are executed with respect to wireless terminals, allowing the system to be linked with various pagers, PHS, and other types of data terminals, as well as with computer networks such as the Internet.

Further, the present invention is provided with transmission servers, thereby enabling message transmission to data terminals from a computer network, obviating the need for complicated procedures, and affording any easy procedure for any type of data terminal.

Further, the present invention is provided with registered user terminals that have been previously registered, with wireless call equipment for transmitting data for execution of prescribed processes with respect to wireless terminals on the basis of instructions from the registered user terminals, and with transmission servers; when there is request for a prescribed process from a registered user terminal, the transmission server executes the prescribed process, and where a request for a prescribed process has been made by an unregistered user terminal, the prescribed process is executed in response to the request from the unregistered user terminal within the scope of prescribed restricting conditions, thereby making it easy to ascertain whether a user accessing a service has found the service to be useful and has subsequently decided to register. This encourages registration, which is advantageous from the service provider's standpoint.

In the present invention, the means employed are not limited to physical means, and the functionality provided by these means may in some instances be realized through software. In some cases, the functionality of a single means may be realized through two or more physical means; in others, the functionality of two or more means may be realized through a single physical means.

The entire disclosure of Japanese Patent Application no. 8-345107 filed on Dec. 25, 1996 including specification, claims, drawings and summary are incorporated herein by reference in its entirety.

What is claimed is:

1. A scheduled data transmission system, comprising user terminals connected to a communications network, wireless calling equipment for transmitting data for execution of prescribed processes to wireless terminals on the basis of instructions from said user terminals and from transmission servers, wherein said user terminals transmit to said transmission servers scheduling information for transmitting said data to said wireless terminals at designated time;

said transmission servers transmit said data to said wireless calling equipment at the designated times on the basis of said scheduling information so that prescribed processes are executed with respect to said wireless terminals;

said communications network is Internet; and wherein said scheduling information for execution of said prescribed processes which is transmitted by said user terminals includes a transmission message, transmission time information, call number of receiving wireless terminal, model information for receiving wireless terminal, and information about said wireless calling equipment to which the receiving wireless terminal subscribed; and said transmission servers convert said transmission messages on the basis of said model information and said information about said wireless calling equipment, and transmit the converted messages to said wireless terminals at times corresponding to said transmission time information.

2. A scheduled data transmission system as claimed in claim 1, wherein said transmission servers comprises code conversion tables for performing code conversions for each service provider and wireless terminal model; and the transmission servers convert said transmission messages into decimal data strings on the basis of said code conversion tables.

3. A scheduled data transmission system as claimed in claim 1, wherein said transmission servers comprises predetermined standard text tables for each service provider and wireless terminal model; and said transmission servers convert said transmission messages into decimal data strings on the basis of said tables.

4. A scheduled data transmission system as claimed in claim 1, wherein said scheduling information which is transmitted by said user terminals for said prescribed processes included e-mail receipt information indicating that an e-mail has reached said terminal, transmission time information, call number of said receiving wireless terminal, model information for said receiving wireless terminal, and information about said wireless calling equipment to which said receiving wireless terminal subscribes; and said transmission servers transmit said e-mail receipt information to said wireless terminals at times corresponding to said transmission time information.

5. A scheduled data transmission system as claimed in claim 1, wherein said scheduling information which is transmitted by said user terminals for said prescribed processes includes registration location switching time information, as well as first location information and second location information for said wireless terminal; and said transmission servers transmit to said wireless calling equipment information for switching said wireless terminal registration location from said first location to said second location at a time corresponding to said registration location switching time information.

6. A scheduled data transmission system as claimed in claim 5, wherein said transmission servers transmit to said wireless terminals an attached message pertaining to switching when transmitting information for switching a registration location.

7. A scheduled data transmission system as claimed in claim 5, wherein said transmission servers transmit messages to both said first location and said second location.

8. A scheduled data transmission system as claimed in claim 1, wherein said scheduling information which is transmitted by said user terminals for said prescribed processes includes password switching time information and password information for setting up or canceling a password, and said transmission servers transmit to said wireless calling equipment information for changing said wireless terminal password status on the basis of said password information at a time corresponding to said password switching time information.

9. A scheduled data transmission system as claimed in claim 8, wherein said transmission servers transmit to said wireless terminals an attached message pertaining to change in password status when transmitting information for changing password status.

10. A scheduled data transmission system as claimed in claim 1, wherein each of said transmission server comprises an Internet protocol router.

11. A scheduled data transmission system as claimed in claim 1, wherein each of said transmission servers comprises a Point-to-Point Protocol server.

12. A transmission server for transmitting to wireless calling equipment, on the basis of instructions from user terminals connected to a communications network, data for execution of prescribed processes with respect to wireless terminals, comprising:

reception means for receiving scheduling information form said user terminals;

a scheduling information database for storing said scheduling information;

a code conversion database for converting said scheduling information so as to be compatible with said wireless terminals and wireless calling equipment;

a processor for converting said scheduling information on the basis of said code conversion database and for outputting converted scheduling information at designated times on the basis of said scheduling information; and transmission means for transmitting scheduling formation that has been converted by said processor to said wireless calling equipment over communications network;

wherein said communications network is Internet, said reception means includes IP (Internet Protocol) routers and PPP (Point-to-Point Protocol) severs; and said processor includes WWW (World Wide Web) servers for setting scheduling data from the user terminals and call servers for receiving call commands from the WWW servers and executing processes.

13. A scheduled data transmission system comprising registered user terminals that have been previously registered, wireless call equipment for transmitting data for execution of prescribed process with respect wireless terminals on the basis of instructions from the registered user terminals, and transmission servers.

wherein, in the event of a request for prescribed process from said registered user terminal, said transmission server executes said prescribed process; and in the event the request for the prescribed process has been made by unregistered user terminal, said transmission server executes said prescribed process in response to the request from said unregistered user terminal with the scope of prescribed restricting conditions;

wherein said transmission server counts the number of accesses by said unregistered user terminal and executes said prescribed process if the number of accesses is within a predetermined range; and wherein said transmission server suspends said prescribed process when the number of accesses exceeds a predetermined range, as well as notifying said unregistered user terminal information that the process has been suspended and providing information pertaining to user terminal registration.

14. A scheduled data transmission system comprising registered user terminals that have been previously registered, wireless call equipment for transmitting data for execution of prescribed process with respect to wireless terminals on the basis of instructions from the registered user terminals, and transmission servers, wherein, in the event of a request for prescribed process from said registered user terminal, said transmission server executes said prescribed process; and in the event the request for the prescribed process has been made by unregistered user terminal, said transmission server executes said prescribed process in response to the request from said unregistered user terminal with the scope of prescribed restricting conditions;

wherein said transmission server counts the number of accesses by said unregistered user terminal and executes said prescribed process if the number of accesses is within a predetermined range; and wherein said transmission server, in the event that requests for prescribed processes have been made by a plurality of unregistered user terminals, transmits a message urging user registration to said unregistered user terminal with the higher frequency of access.

15. A scheduled data transmission system as claimed in claim 13, wherein said transmission server, after suspending said prescribed process, re-enables said prescribed process for said unregistered user terminal after a prescribed period of time has elapsed.

16. A scheduled data transmission method for transmitting data for execution of prescribed process with respect to wireless terminals on the basis of instructions from a registered user terminal that has been previously registered, comprising:

a first step in which a determination is made as to whether there has been a request from said registered user terminal;

a second step in which, in the event of request from said registered user terminal, data for execution of said prescribed process is transmitted;

a third step in which, in the event of a request from unregistered user terminal, the number of accesses by this terminal are counted;

a fourth step in which, where the count value falls between first value and second value data for execution of said prescribed process in response to the request from said unregistered user terminal is transmitted;

a fifth step in which, where the count value exceeds the second value, transmission of data for execution of said prescribed process in response to the request from said unregistered user terminal is suspended;

a sixth step in which, after suspending transmission, said unregistered user terminal is notified of the suspension, and information pertaining to terminal registration process is provided; and a seventh step in which, once a prescribed time interval has elapsed, the count value is set to a value below the second value.

* * * * *